United States Patent [19]

Bando

[11] Patent Number: 5,733,353
[45] Date of Patent: Mar. 31, 1998

[54] GLASS-PLATE WORKING APPARATUS

[75] Inventor: Shigeru Bando, Tokushima, Japan

[73] Assignee: Bando Kiko Co., Ltd., Japan

[21] Appl. No.: 637,723

[22] PCT Filed: Jan. 19, 1996

[86] PCT No.: PCT/JP96/00088

§ 371 Date: Apr. 30, 1996

§ 102(e) Date: Apr. 30, 1996

[87] PCT Pub. No.: WO96/23737

PCT Pub. Date: Aug. 8, 1996

[30] Foreign Application Priority Data

Jan. 31, 1995 [JP] Japan .................................. 7-34223

[51] Int. Cl.$^6$ .................................................. C03B 9/46
[52] U.S. Cl. ........................... 65/174; 65/56; 65/97; 65/105
[58] Field of Search .......................... 65/174, 56, 97, 65/105; 225/94

[56] References Cited

U.S. PATENT DOCUMENTS

| | | | |
|---|---|---|---|
| 4,698,088 | 10/1987 | Bando | 65/174 |
| 5,040,342 | 8/1991 | McGuire | 51/283 |
| 5,301,867 | 4/1994 | Bando | 225/104 |

FOREIGN PATENT DOCUMENTS

| | | |
|---|---|---|
| 62-78123 | 4/1987 | Japan . |
| 3-69853 | 11/1991 | Japan . |
| 6-24779 | 2/1994 | Japan . |

*Primary Examiner*—Donald E. Czaja
*Assistant Examiner*—Sean Vincent
*Attorney, Agent, or Firm*—Nixon & Vanderhye

[57] ABSTRACT

A glass-plate working apparatus 1 includes a glass plate carrying-in section 2; a glass plate bend-breaking section 3; a glass plate peripheral-edge grinding section 4; and a glass plate carrying-out section 5. The glass plate bend-breaking section 3 is provided with a supporting device 7 for supporting a glass plate 6 from the glass plate carrying-in section 2; a bend-breaking head device 11 for forming a main cut line 8 for bend-breaking and an edge cut line 9 on the glass plate 6, and for pressing positions 10, 10 on the glass plate 6 so as to bend-break the glass plate 6; and a bend-breaking head moving device 12 for moving the bend-breaking head device 11. The glass plate peripheral-edge grinding section 4 is provided with a supporting device 13 for supporting the glass plate 6; a grinding head device 15 for grinding a bend-broken edge 14 of the glass plate 6; and a grinding-head moving device 16 for moving the grinding head device 15.

7 Claims, 10 Drawing Sheets

GLASS-PLATE WORKING APPARATUS

TECHNICAL FIELD

The present invention relates to a glass-plate working apparatus for manufacturing, for example, window glass for an automobile, such as a front window, a side window, and a rear window, panes for buildings, and other glass plates of predetermined configurations by bend-breaking unworked plate glass into a given configuration and by grinding a bend-broken edge of the bend-broken glass plate.

BACKGROUND ART

Conventionally, in a conventional glass-plate working apparatus of this type, a glass-plate carrying-in section and a main cut-line forming section in proximity to the glass-plate carrying-in section are disposed. In this main cut-line forming section, a given main cut line for bend-breaking is formed on unworked plate glass, and then the unworked plate glass on which the main cut line for bend-breaking has been formed is transported to a glass plate bend-breaking section which is disposed in proximity to the main cut-line forming section. In the glass plate bend-breaking section, an edge cut line is formed on the unworked plate glass on which the main cut line has been formed. Subsequently, the unworked plate glass on which the main cut line and the edge cut line have been formed is subjected to bend-breaking. The bend-broken edge of the bend-broken glass plate is ground in a glass plate peripheral-edge grinding section which is disposed in proximity to the glass-plate bend-breaking section.

With the conventional glass-plate working apparatus described above, since the main cut-line forming section and the glass plate bend-breaking section are provided, the installation space of the apparatus becomes large. In addition, cutter heads are required for the main cut-line forming section and the glass plate bend-breaking section, so that there is a problem in that the cost of the apparatus becomes high. Further, a plurality of stages of transporting the unworked plate glass, including the transportation of the unworked plate glass from the glass plate carrying-in section to the main cut-line forming section and the transportation of the unworked plate glass from the main cut-line forming section to the glass plate bend-breaking section, are required. For this reason, the conventional glass-plate working apparatus has various problems ascribable to these stages of transportation, such as a decline in productivity due to the transport time, and the problem of a positioning error between the placement of the glass plate on the main cut-line forming section and the placement of the glass plate on the glass plate bend-breaking section.

The present invention has been devised in view of the above-described aspects, and its object is to provide a glass-plate working apparatus which is capable of overcoming the above-described problems.

Another object of the present invention is to provide a glass-plate working apparatus which is capable of fabricating glass plates of given configurations with high productivity.

Still another object of the present invention is to provide a glass-plate working apparatus which is capable of forming a main cut line and an edge cut line, as desired, and of working glass plates having aimed configurations with high accuracy.

DISCLOSURE OF THE INVENTION

In accordance with the present invention, the above objects are attained by a glass-plate working apparatus comprising: a supporting device for supporting a glass plate; at least one bend-breaking head device for forming a cut line for bend-breaking on the glass plate supported by the supporting device, and for pressing a position on the glass plate on which the cut line has been formed, so as to bend-break the glass plate; and a bend-breaking head moving device for relatively moving the bend-breaking head device with respect to the glass plate supported by the supporting device, in correspondence with the cut line for bend-breaking to be formed as well as the position on the glass plate to be pressed.

In addition, in accordance with the present invention, the above objects are also attained by a glass-plate working apparatus comprising: a glass plate carrying-in section; a glass plate bend-breaking section disposed in proximity to the glass plate carrying-in section; a glass plate peripheral-edge grinding section disposed in proximity to the glass plate bend-breaking section; and a glass plate carrying-out section disposed in proximity to the glass plate peripheral-edge grinding section, wherein the glass plate bend-breaking section is provided with a supporting device for supporting a glass plate from the glass plate carrying-in section; at least one bend-breaking head device for forming a cut line for bend-breaking on the glass plate supported by the supporting device, and for pressing a predetermined position on the glass plate on which the cut line has been formed, so as to bend-break the glass plate; and a bend-breaking head moving device for relatively moving the bend-breaking head device with respect to the glass plate supported by the supporting device, in correspondence with the cut line for bend-breaking to be formed as well as the predetermined position on the glass plate to be pressed, and wherein the glass plate peripheral-edge grinding section is provided with a supporting device for supporting the glass plate from the glass plate bend-breading section; at least one grinding head device for grinding a bend-broken edge of the glass plate supported by the supporting device of the glass plate peripheral-edge grinding section; and a grinding-head moving device for relatively moving the grinding head device with respect to the glass plate supported by the supporting device of the glass plate peripheral-edge grinding section, in correspondence with the bend-broken edge of the glass plate to be ground.

In the present invention, a transporting device may be further provided for transporting the glass plate from the glass plate carrying-in section to the supporting device of the glass plate bend-breaking section, from the supporting device of the glass plate bend-breaking section to the supporting device of the glass plate peripheral-edge grinding section, and from the supporting device of the glass plate peripheral-edge grinding section to the glass plate carrying-out section, respectively.

In a preferred example, the supporting device of the glass plate bend-breaking section is provided with a belt conveyor having a flexible endless belt, a supporting member for supporting the flexible endless belt on a reverse side thereof, and a traveling device for traveling the endless belt, and the bend-breaking head device is provided with a cutter device for forming a main cut line and an edge cut line, as well as a press-breaking device for press-breaking the glass plate.

Furthermore, in the present invention, a bend-breaking head rotating device may be further provided for rotating the bend-breaking head device about an axis which is perpendicular to a plane of movement of the bend-breaking head device by the bend-breaking head moving device. Also, a grinding-head rotating device may be further provided for rotating the grinding head device about an axis which is perpendicular to a plane of movement of the grinding head device by the grinding-head moving device.

In the glass-plate working apparatus in accordance with the present invention, the unworked plate glass subject to bend-breaking is supported by being placed on the supporting device. Next, while the bend-breaking head device is being moved relative to the glass plate supported by the glass-plate supporting device by operating the bend-breaking head moving device, a main cut line for bend-breaking is formed and an edge cut line is also formed on the glass plate supported by the supporting device by means of the bend-breaking head device. Predetermined positions on the glass plate on which the cut lines have been formed are pressed to bend-break the glass plate.

In accordance with the present invention, it is possible to provide a glass-plate working apparatus which is capable of overcoming the conventional problems, which is capable of fabricating glass plates of given configurations with high productivity, and which is capable of forming a main cut line and an edge cut line, as desired, and of working glass plates having aimed configurations with high accuracy.

Hereafter, a detailed description will be given of the present invention on the basis of preferred embodiments illustrated in the drawings. It should be noted that the present invention is not limited to these embodiments.

EMBODIMENTS

Figure 1:
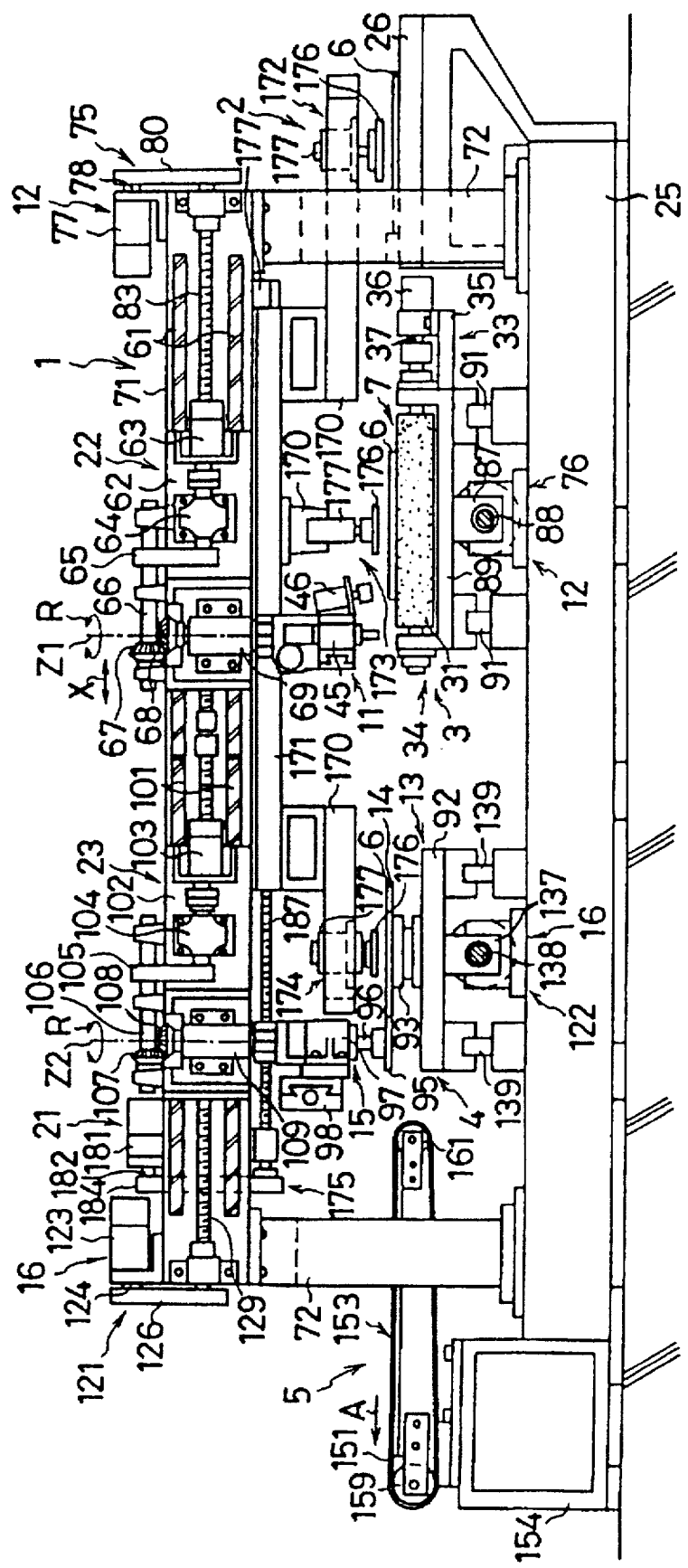
FIG. 1 is a front elevational view of a preferred embodiment of the present invention.
Figure 2:
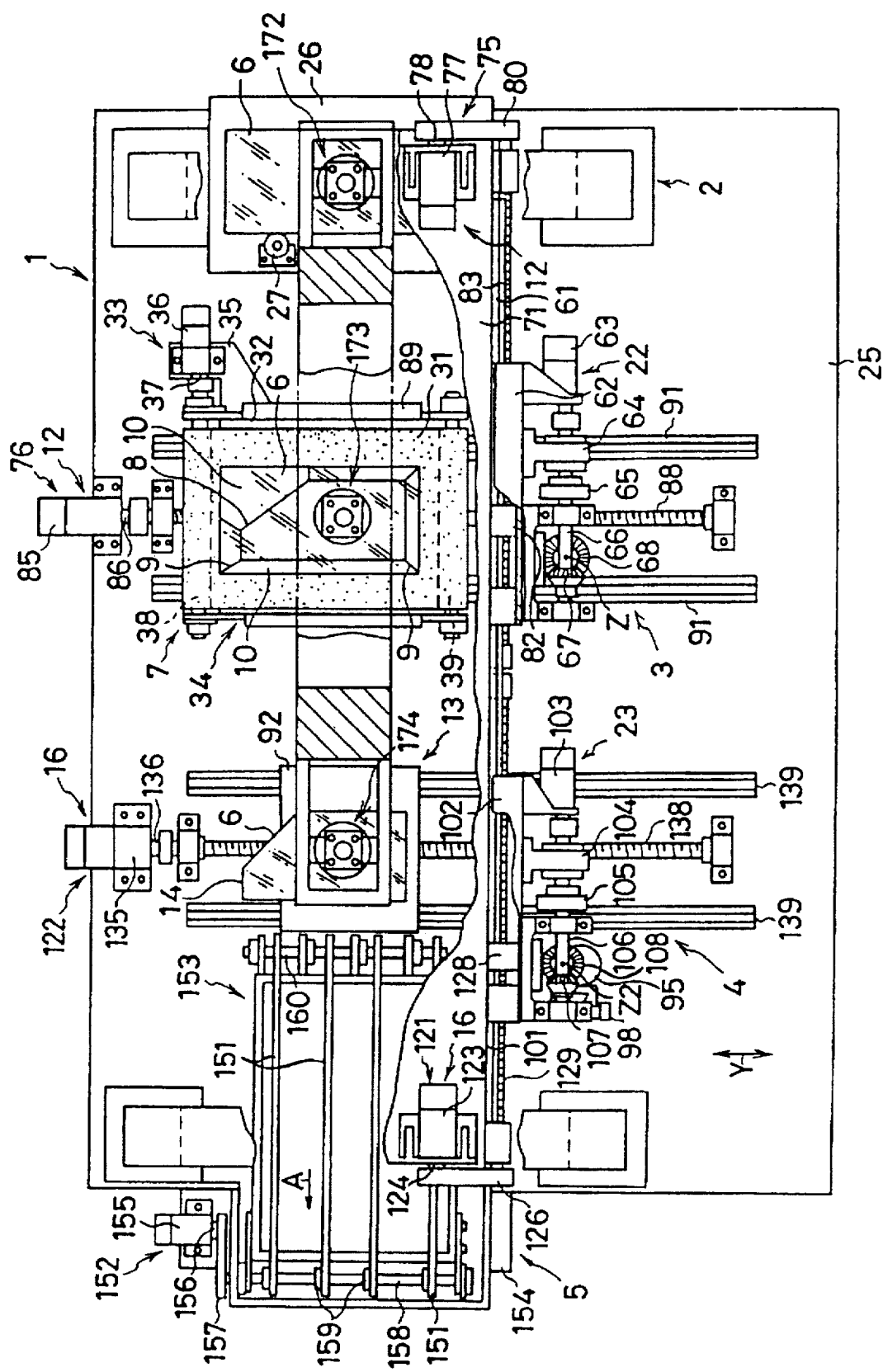
FIG. 2 is a partially cutaway plan view of the embodiment shown in FIG. 1.

In FIGS. 1 to 5, a glass-plate working apparatus 1 in accordance with this embodiment comprises a glass plate carrying-in section 2; a glass plate bend-breaking section 3 disposed in proximity to the glass plate carrying-in section 2; a glass plate peripheral-edge grinding section 4 disposed in proximity to the glass plate bend-breaking section 3; and a glass plate carrying-out section 5 disposed in proximity to the glass plate peripheral-edge grinding section 4. The glass plate bend-breaking section 3 is provided with a supporting device 7 for supporting a glass plate 6 which is unworked plate glass from the glass plate carrying-in section 2; a bend-breaking head device 11 for forming a main cut line 8 for bend-breaking and an edge cut line 9 on the glass plate 6 supported by the supporting device 7, and for pressing predetermined positions 10, 10, ... on the glass plate 6 on which the cut lines 8 and 9 have been formed, so as to bend-break the glass plate 6; and a bend-breaking head moving device 12 for relatively moving the bend-breaking head device 11 with respect to the glass plate 6 supported by the supporting device 7, in correspondence with the main cut line 8 for bend-breaking and the edge cut line 9 which are to be formed as well as the predetermined positions 10, 10, ... on the glass plate 6 to be pressed. The glass plate peripheral-edge grinding section 4 is provided with a supporting device 13 for supporting the glass plate 6 from the glass plate bend-breading section 3; a grinding head device 15 for grinding a bend-broken edge 14 of the glass plate 6 supported by the supporting device 13; and a grinding-head moving device 16 for relatively moving the grinding head device 15 with respect to the glass plate 6 supported by the supporting device 13, in correspondence with the bend-broken edge 14 of the glass plate 6 to be ground.

The glass-plate working apparatus 1 is further provided with a transporting device 21 for transporting the glass plate 6, which is to be processed or has been processed, from the glass plate carrying-in section 2 to the supporting device 7, from the supporting device 7 to the supporting device 13, and from the supporting device 13 to the glass plate carrying-out section 5, respectively; a bend-breaking head rotating device 22 for rotating the bend-breaking head device 11 in an R direction about a Z1 axis which is perpendicular to the plane of movement of the bend-breaking head device 11 by the bend-breaking head moving device 12, i.e., the X–Y plane in this example; and a grinding-head rotating device 23 for rotating the grinding head device 15 in the R direction about a Z2 axis which is perpendicular to the plane of movement of the grinding head device 15 by the grinding-head moving device 16, i.e., the X–Y plane in this example.

The glass plate carrying-in section 2 has, among others, a supporting base 26 attached to a base 25 as well as rollers 27 which are rotatably attached to the supporting base 26 so as to position the glass plate 6 which is placed on the supporting base 26.

The supporting device 7 is provided with a belt conveyor 34 having a flexible endless belt 31, a plate-like supporting member 32 for supporting the endless belt 31 on the reverse side thereof, and a traveling device 33 for traveling the endless belt 31. The traveling device 33 is provided with an electric motor 36 mounted on a frame 35, a driving drum 38 connected to an output rotating shaft 37 of the electric motor 36 and rotatably supported by a slider 89 supporting the frame 35, and a driven drum 39 rotatably supported by the slider 89. The endless belt 31 is trained between the driving drum 38 and the driven drum 39. In the supporting device 7 in which the glass plate 6 subject to bend-breaking is placed on the endless belt 31, in a state in which the frame 35 has been moved to an initial position after completion of one bend-breaking operation, if the endless belt 31 is made to travel by the rotation of the output rotating shaft 37 due to the operation of the electric motor 36, bend-broken scrap 40 (cullet) remaining on the endless belt 31 is discharged toward a chute 41 (not shown in FIGS. 2 and 4) shown in FIG. 3. As a result, after the completion of one bend-breaking operation, the bend-broken scrap 40 slides on the chute 41, and is discharged into a bend-broken-scrap storing box 42.

Figure 3:
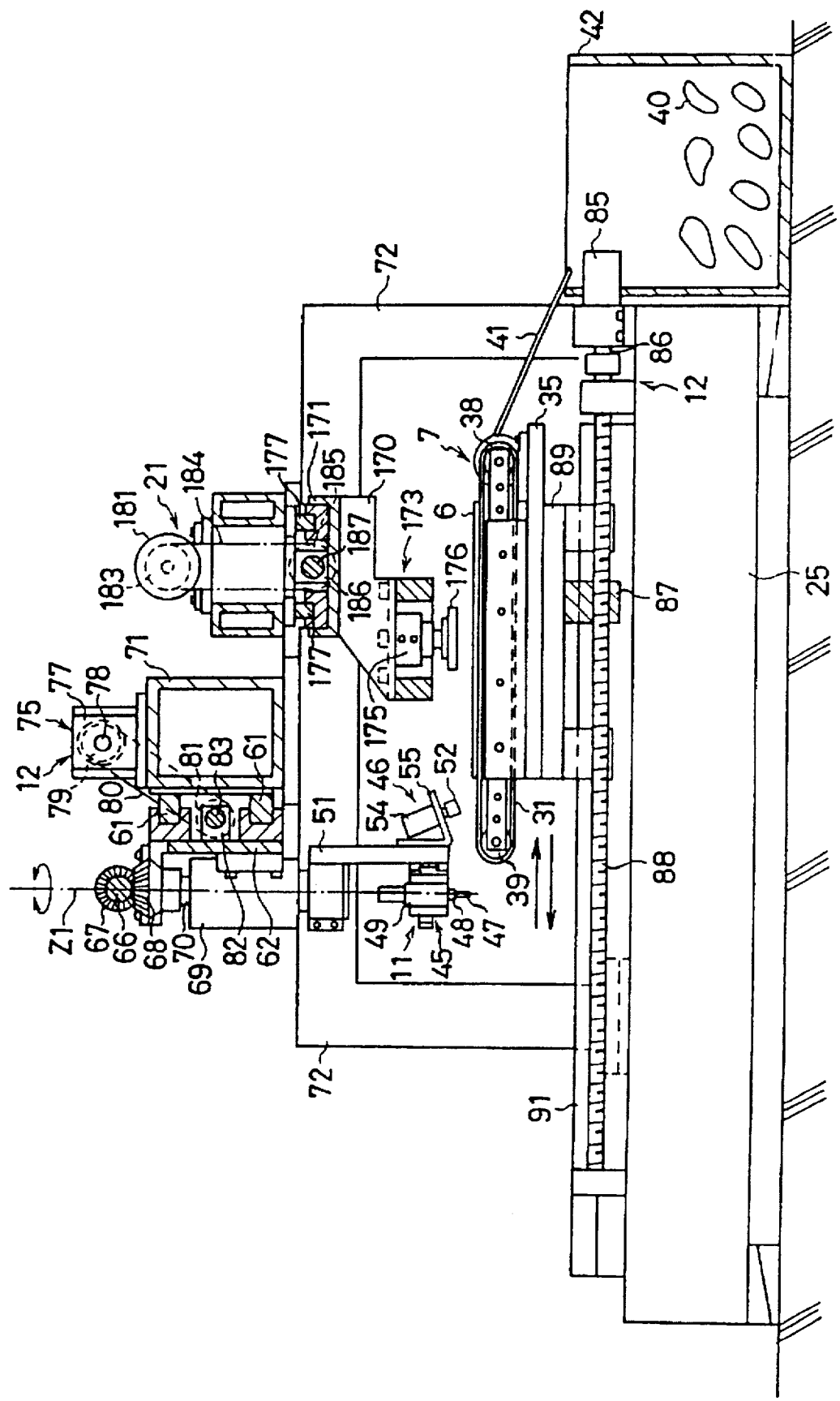
FIG. 3 is a partially cutaway side elevational view of the embodiment shown in FIG. 1.
Figure 4:
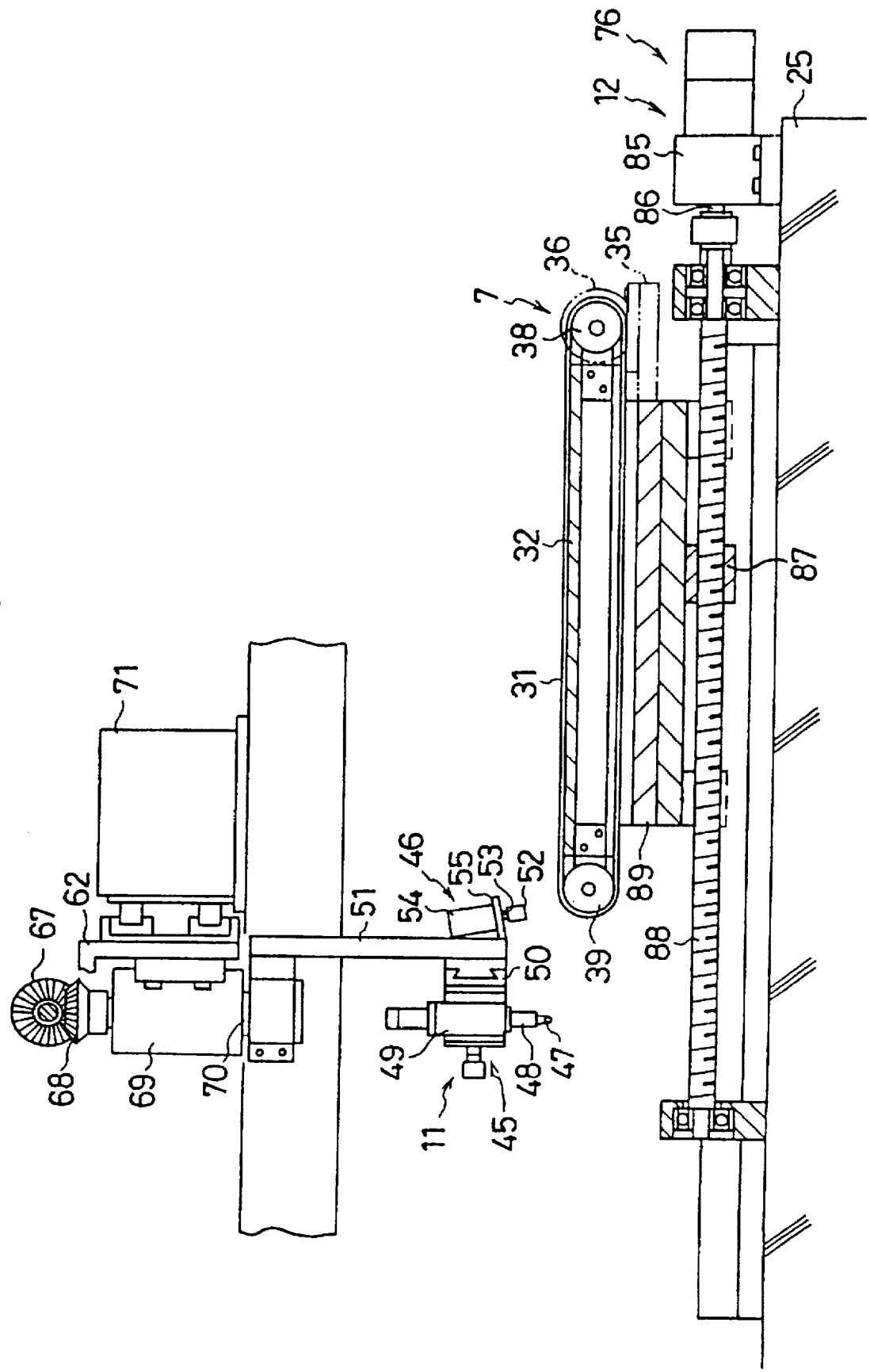
FIG. 4 is a partially detailed explanatory diagram of the embodiment shown in FIG. 1.
Figure 5:
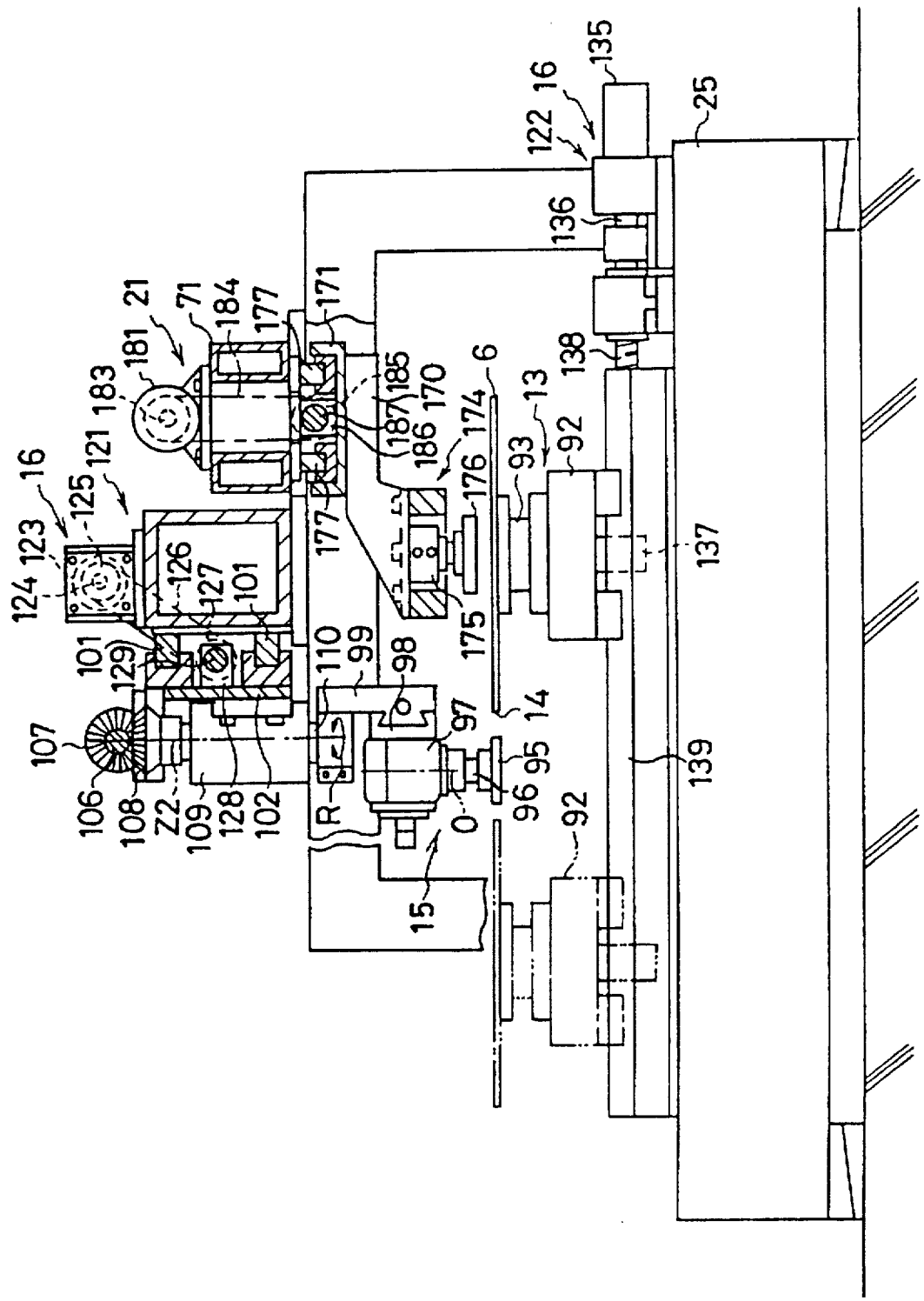
FIG. 5 is a partially cutaway side elevational view of the embodiment shown in FIG. 1.

As shown in detail in FIGS. 3 and 4, the bend-breaking head device 11 is provided with a cutter device 45 for forming the main cut line 8 and the edge cut line 9, as well as a press-breaking device 46 for press-breaking the glass plate 6. The cutter device 45 is provided with a cutter wheel 47 and a pneumatic cylinder unit 49 having a piston rod 48 with the cutter wheel 47 attached to a distal end thereof. The pneumatic cylinder unit 49 is mounted on a bracket 51 by means of an adjusting mechanism 50 for adjusting the initial position of the cutter wheel 47 in the X—Y direction. The press-breaking device 46 is provided with a pressing member 52 and a pneumatic cylinder unit 54 having a piston rod 53 with the pressing member 52 attached to a distal end thereof. The pneumatic cylinder unit 54 is mounted on the bracket 51 by means of a mounting member 55. When the pneumatic cylinder unit 49 of the cutter device 45 is actuated, and its piston rod 48 is hence extended, the cutter wheel 47 is pressed against the glass plate 6 placed on the endless belt 31, thereby forming the main cut line 8 and the edge cut line 9. When the pneumatic cylinder unit 54 of the press-breaking device 46 is actuated, and its piston rod 53 is hence extended, the pressing member 52 is pressed against the positions 10, 10, . . . on the glass plate 6 placed on the endless belt 31, thereby slightly straining the glass plate 6 and bend-breaking the glass plate 6 along the cut lines 8 and 9.

The bend-breaking head rotating device 22 is provided with a slider 62 fitted to a pair of guide rails 61, which extend in the X direction in parallel to each other, in such a manner as to be movable in the X direction; an electric motor 63 supported by the slider 62; a rotating shaft 66 rotatably supported by the slider 62 and connected to an output rotating shaft of the electric motor 63 via a reducing gear 64, a pulley and a timing belt 65; a bevel gear 67 secured to the rotating shaft 66; and a Z-axis member 70 rotatably supported by the slider 62 by means of a bearing 69, a bevel gear 68 meshing with the bevel gear 67 being secured to an upper end of the Z-axis member 70, and the bracket 51 being secured to a lower end thereof. The pair of guide rails 61 are mounted on an upper frame 71 which is supported by the base 25 via a vertical frame 72. As for the bend-breaking head rotating device 22, as the electric motor 63 is operated, the rotating shaft 66 is rotated by means of its output rotating shaft, the reducing gear 64, and the pulley and the timing belt 65. As the rotating shaft 66 is thus rotated, the Z-axis member 70 is rotated about the Z1 axis in the R direction by means of the bevel gear 67 and the bevel gear 68. Then, the bend-breaking head device 11 mounted on the bracket 51 is rotated about the Z1 axis in the R direction. At the time of the formation of the main cut line 8 and the edge cut line 9, a blade of the cutter wheel 47 of the cutter device 45 is oriented in the direction in which the main cut line 8 and the edge cut line 9 are formed. At the time of press-breaking, the pressing direction of the pressing member 52 of the press-breaking device 46 is set as required.

The bend-breaking head moving device 12 is provided with an X-direction moving unit 75 for moving the bend-breaking head device 11 in the X direction as well as a Y-direction moving unit 76 for moving the glass plate 6 in the Y direction. The X-direction moving unit 75 has an electric motor 77 mounted on the upper frame 71 as well as a screw shaft 83 which is rotatably supported by the upper frame 71 and is threadedly engaged with nuts 82 secured to the slider 62, the rotation of an output shaft 78 of the electric motor 77 being transmitted to the screw shaft 83 by means of a pulley 79, a belt 80, and a pulley 81. As the electric motor 77 is operated, and its output shaft 78 is rotated, the screw shaft 83 is rotated by means of the pulley 79, the belt 80, and the pulley 81 so as to move the slider 62 in the X direction and to move the bend-breaking head device 11 mounted on the slider 62 by means of the Z-axis member 70 and the bracket 51 in the X direction. The Y-direction moving unit 76 has an electric motor 85 mounted on the base 25 as well as a screw shaft 88 which is connected to an output rotating shaft 86 of the electric motor 85 and is threadedly engaged with nuts 87 secured to the slider 89. The slider 89 to which the frame 35 is fixed is mounted movably in the Y direction on a pair of guide rails 91 extending in the Y direction in parallel to each other and disposed on the base 25. The screw shaft 88 is rotatably disposed on the base 25. As for the Y-direction moving unit 76, as the electric motor 85 is operated, and its output shaft 86 is rotated, the screw shaft 88 is rotated to move the slider 89 in the Y direction. As the slider 89 is thus moved in the Y direction, the bend-breaking head device 11 is relatively moved in the Y direction with respect to the glass plate 6 placed on the endless belt 31 supported by the slider 89.

The supporting device 13 has a slider 92 and a vacuum sucking unit 93 provided on the slider 92, and sucks, supports, and fixes the glass plate 6 from the glass plate bend-breaking section 3 by means of the vacuum sucking unit 93 during the grinding and polishing of its bend-broken edge 14.

The grinding head device 15 is provided with a grinding wheel 95 and an electric motor 97 having an output rotating shaft 96 to a lower end of which the grinding wheel 95 is secured. As shown in detail in FIG. 5, the electric motor 97 is mounted on a bracket 99 by means of an adjusting mechanism 98 for adjusting the initial position of the grinding wheel 95 in the X–Y–Z direction. As the grinding wheel 95 is rotated due to the operation of the electric motor 97, the grinding head device 15 grinds and polishes the bend-broken edge 14 of the glass plate 6.

The grinding-head rotating device 23 is provided with a slider 102 fitted to a pair of guide rails 101, which extend in the X direction in parallel to each other, in such a manner as to be movable in the X direction; an electric motor 103 supported by the slider 102; a rotating shaft 106 rotatably supported by the slider 102 and connected to an output rotating shaft of the electric motor 103 via a reducing gear 104 and a pulley and a timing belt 105; a bevel gear 107 secured to the rotating shaft 106; and a Z-axis member 110 rotatably supported by the slider 102 by means of a bearing 109, a bevel gear 108 meshing with the bevel gear 107 being secured to an upper end of the Z-axis member 110, and the bracket 99 being secured to a lower end thereof. The pair of guide rails 101 are mounted on the upper frame 71. As for the grinding-head rotating device 23, as the electric motor 103 is operated, the rotating shaft 106 is rotated by means of its output rotating shaft, the reducing gear 104, and the pulley and the timing belt 105. As the rotating shaft 106 is thus rotated, the Z-axis member 110 is rotated about the Z2 axis in the R direction by means of the bevel gear 107 and the bevel gear 108. Then, the grinding head device 15 mounted on the bracket 99 is rotated about the Z2 axis in the R direction. At the time of the grinding and polishing of the bend-broken edge 14, the grinding wheel 95 of the grinding head device 15 is oriented such that the center of rotation O of the grinding wheel 95 is located above the normal line of the bend-broken edge 14 at the grinding and polishing position.

The grinding-head moving device 16 is provided with an X-direction moving unit 121 for moving the grinding head device 15 in the X-direction and a Y-direction moving unit 122 for moving the glass plate 6 in the Y-direction. The X-direction moving unit 121 has an electric motor 123 mounted on the upper frame 71 as well as a screw shaft 129 which is rotatably supported by the upper frame 71 and is threadedly engaged with nuts 128 secured to the slider 102, the rotation of an output rotating shaft 124 of the electric motor 123 being transmitted to the screw shaft 129 by means of a pulley 125, a belt 126, and a pulley 127. As the electric motor 123 is operated, and its output shaft 124 is rotated, the screw shaft 129 is rotated by means of the pulley 125, the belt 126, and the pulley 127 so as to move the slider 102 in the X direction and to move the grinding head device 15 mounted on the slider 102 by means of the Z-axis member 110 and the bracket 99 in the X direction. The Y-direction moving unit 122 has an electric motor 135 mounted on the base 25 as well as a screw shaft 138 which is connected to an output rotating shaft 136 of the electric motor 135 and is threadedly engaged with nuts 137 secured to the slider 92. The slider 92 is mounted movably in the Y direction on a pair of guide rails 139 extending in the Y direction in parallel to each other and disposed on the base 25. The screw shaft 138 is rotatably disposed on the base 25. As for the Y-direction moving unit 122, as the electric motor 135 is operated, and its output shaft 136 is rotated, the screw shaft 138 is rotated to move the slider 92 in the Y direction. As the slider 92 is thus moved in the Y direction, the bend-the grinding head device 15 is relatively moved in the Y direction with respect to the glass plate 6 placed on the vacuum sucking unit 93 supported by the slider 92.

The glass plate carrying-out section 5 is provided with a plurality of flexible endless narrow belts 151 disposed in parallel to each other and a traveling device 152 for causing the endless belts 151 to travel. The traveling device 152 is provided with an electric motor 155 mounted on a frame 154 on the side of the base 25; a plurality of drive rollers 159 connected to an output rotating shaft 156 of the electric motor 155 via a pulley and a belt 157 and the like and rotatably supported on a shaft 158 by means of the frame 154; and a plurality of driven rollers 161 rotatably supported on a shaft 160 by means of the frame 154. The endless narrow belts 151 are trained between the drive rollers 159 and the driven rollers 161. As for the glass plate carrying-out section 5, as the electric motor 155 is operated, and its output rotating shaft 156 is rotated, the belt 157 and the shaft 158 are rotated so as to move the endless narrow belts 151 in the A direction and to move the glass plate 6 placed on the endless narrow belts 151 from the glass plate peripheral-edge grinding section 4 in the A direction.

The transporting device 21 is provided with three lifting devices 172, 173, and 174 mounted on the slider 171 as well as a moving device 175 for moving the slider 171 in the X direction. Each of the lifting devices 172, 173, and 174 has a vacuum suction head 176 for sucking and holding the glass plate 6 under a vacuum and a pneumatic cylinder unit 177 having a piston rod in which the vacuum suction head 176 is attached to a distal end thereof, so as to raise and lower the vacuum suction head 176 when the pneumatic cylinder unit 177 is actuated. The slider 171 is fitted movably in the X direction to a pair of guide rails 177 extending in the X direction in parallel to each other and disposed on the underside of the upper frame 71.

The moving device 175 has an electric motor 181 mounted on the upper frame 71 as well as a screw shaft 187 which is rotatably supported by the underside of the upper frame 71 and is threadedly engaged with nuts 186 secured to the slider 171, the rotation of an output shaft 182 of the electric motor 181 being transmitted to the screw shaft 187 by means of a pulley 183, a belt 184, and a pulley 185. As the electric motor 181 is operated, and its output shaft 182 is rotated, the screw shaft 187 is rotated by means of the pulley 183, the belt 184, and the pulley 185 so as to move the slider 171 in the X direction and to move the lifting devices 172, 173, and 174 mounted on the slider 171 by means of the bracket 170 in the X direction.

As a result of the movement in the X direction of the lifting devices 172, 173, and 174 by the moving device 175 and the sucking, holding, and lifting of the glass plate 6 by the lifting devices 172, 173, and 174, the glass plate 6 supplied onto the supporting base 26 is transported onto the endless belt 31, the bend-broken glass plate 6 on the endless belt 31 is transported onto the vacuum sucking unit 93, and the glass plate 6 whose edge 14 on the vacuum sucking unit 93 has been ground and polished is transported onto the endless narrow belts 151. The placing onto the endless belt 31 of the glass plate 6 supplied onto the supporting base 26 is effected by the lifting device 172, the placing onto the the vacuum sucking unit 93 of the bend-broken glass plate 6 on the endless belt 31 is effected by the lifting device 173, and the placing onto the endless narrow belts 151 of the glass plate 6 whose edge 14 on the vacuum sucking unit 93 has been ground and polished is effected by the lifting device 174.

It should be noted that the glass-plate working apparatus 1 is provided with a numerical controller in addition to the above-described devices. The numerical controller controls the above-described operation and the operation which will be described below, by a program which has been stored in advance.

The glass plate 6 is first positioned and placed on the supporting base 26 of the glass plate carrying-in section 2 by means of the rollers 27 and the like. As a result of the reciprocating motion in the X direction of the slider 171 of the transporting device 21, the glass plate 6 placed on the supporting base 26 is transported onto the endless belt 31, the bend-broken glass plate 6 on the endless belt 31 is transported onto the vacuum sucking unit 93, and the glass plate 6 whose edge 14 on the vacuum sucking unit 93 has been ground and polished is transported onto the endless narrow belts 151.

In the glass plate bend-breaking section 3, the bend-breaking head device 11 actuates the pneumatic cylinder unit 49 to press the cutter wheel 47 against the glass plate 6 placed on the endless belt 31. In the state in which the cutter wheel 47 is pressed against the glass plate 6, the bend-breaking head moving device 12 moves the bend-breaking head device 11 in the X direction by means of the X-direction moving unit 75, and moves the glass plate 6 placed on the endless belt 31 in the Y direction by means of the Y-direction moving unit 76. Consequently, the preprogrammed main cut line 8 is formed on the glass plate 6 placed on the endless belt 31 by means of the cutter wheel 47. After the formation of the main cut line 8, the preprogrammed edge cut line 9 is formed on the glass plate 6 placed on the endless belt 31 by the raising and lowering of the cutter wheel 47 due to the actuation of the pneumatic cylinder unit 49, by the movement of the bend-breaking head device in the X direction due to the operation of the X-direction moving unit 75, and by the movement of the glass plate 6 in the Y direction due to the operation of the Y-direction moving unit 76. After the formation of the edge cut line 9, the pressing member 52 is pressed against the preprogrammed positions 10, 10, . . . on the glass plate 6 placed on the endless belt 31 by the projection and retraction of the pressing member 52 due to the actuation of the pneumatic cylinder unit 54, by the movement of the bend-breaking head device 11 in the X direction due to the operation of the X-direction moving unit 75, and by the movement of the glass plate 6 in the Y direction due to the operation of the Y-direction moving unit 76. Consequently, the glass plate 6 placed on the endless belt 31 is slightly strained, and is bend-broken along the cut lines 8 and 9. During the formation of the cut lines 8 and 9 and the bend-breaking operation, the bend-breaking head rotating device 22 is operated, and the blade of the cutter wheel 47 is oriented in the direction in which the main cut line 8 and the edge cut line 9 are formed, and the pressing member 52 is oriented in a predetermined pressing direction. Incidentally, an arrangement may be provided such that after the formation of part of the main cut line 8, the edge cut line 9 which continues from the same is then formed, and this procedure is subsequently repeated, thereby forming the whole of the main cut line 8 and the edge cut line 9.

In the glass plate peripheral-edge grinding section 4, the vacuum sucking unit 93 sucks under a vacuum and fixes the glass plate 6 from the glass plate bend-breaking section 3, and the grinding head device 15 operates the electric motor 97 to rotate the grinding wheel 95. In the state in which the grinding wheel 95 is rotating, the grinding-head moving device 16 moves the grinding head device 15 in the X direction by means of the X-direction moving unit 121, and moves the glass plate 6 fixed on the vacuum sucking unit 93 in the Y direction by means of the Y-direction moving unit 122. Consequently, the bend-broken edge 14 of the glass plate 6 fixed on the vacuum sucking unit 93 is subjected to preprogrammed grinding and polishing by the grinding wheel 95. During the grinding and polishing operations, the grinding-head rotating device 23 is operated, and the grinding head device 15 is rotated such that such that the center of rotation O of the grinding wheel 95 of the grinding head device 15 is located above the normal line of the bend-broken edge 14 at the grinding and polishing position.

After the completion of the operation of bend-breaking the glass plate 6 in the glass plate bend-breaking section 3 and the operation of grinding and polishing the bend-broken edge 14 in the glass plate peripheral-edge grinding section 4, the transporting device 21 is operated again, and the glass plate 6 subject to bend-breaking and the glass plate 6 subject to grinding and polishing are newly transported onto the endless belt 31 and the sucking unit 93, respectively. During the operation of the transporting device 21, as the endless belt 31 travels due to the operation of the electric motor 36, the bend-broken scrap 40 (cullet) remaining on the endless belt 31 is fed toward the chute 41, and slides on the chute 41 so as to be discharged into the bend-broken-scrap storing box 42.

In accordance with the glass-plate working apparatus 1 described above, since the formation of the main cut line 8 and the edge cut line 9 and the press-breaking can be carried out in the glass plate bend-breaking section 3, it is possible to produce glass plates of given configurations with high productivity. In addition, the installation space can be made small, and the problems associated with the transport of the glass plates can be reduced.

The above-described glass-plate working apparatus 1 is arranged such that one glass plate at a time is transported onto the glass plate bend-breaking section 3 and the glass plate peripheral-edge grinding section 4, respectively, so as to effect the bend-breaking and peripheral edge grinding of the glass plate 6 with respect to one glass plate at a time, respectively. Alternatively, an arrangement may be provided as shown in FIGS. 6 and 7 in which the bend-breaking and peripheral edge grinding of the glass plate 6 are effected with respect to two or more glass plates at a time, respectively, (two glass plates, respectively, in the example shown in FIGS. 6 and 7).

Figure 6:
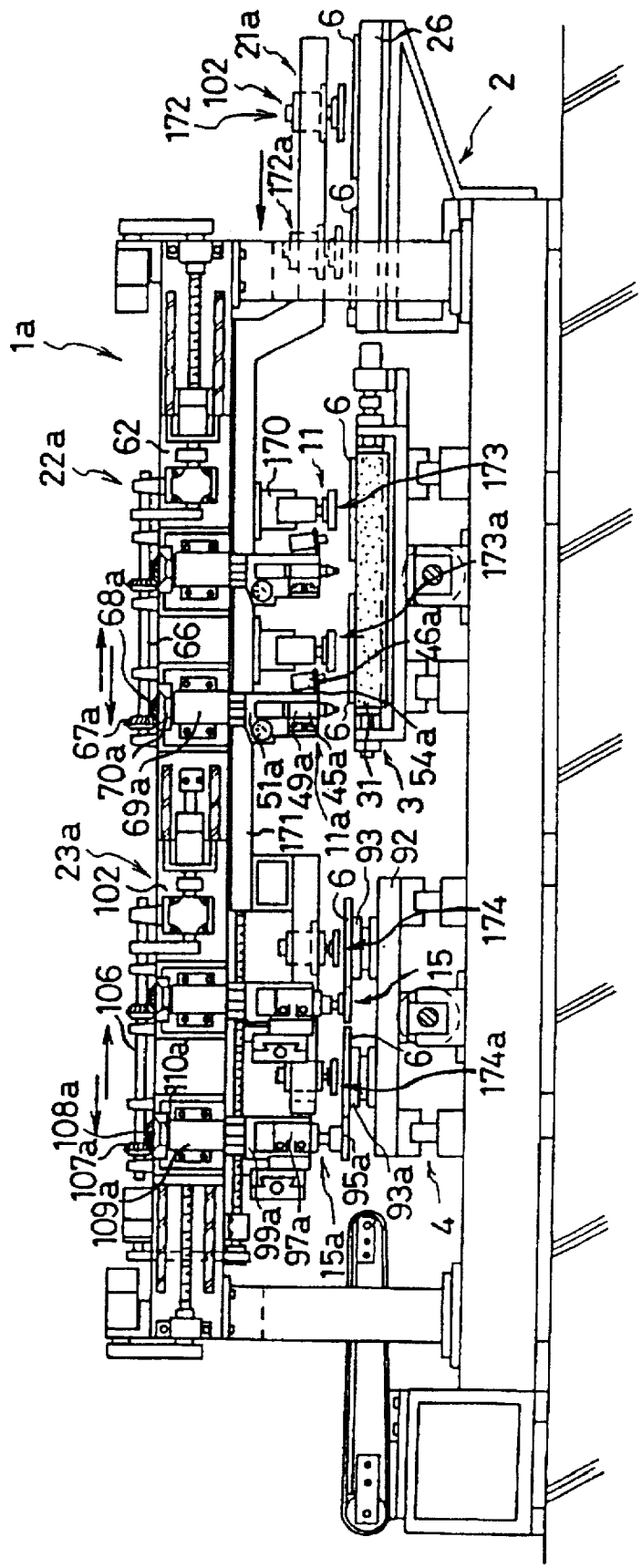
FIG. 6 is a front elevational view of another preferred embodiment of the present invention.
Figure 7:
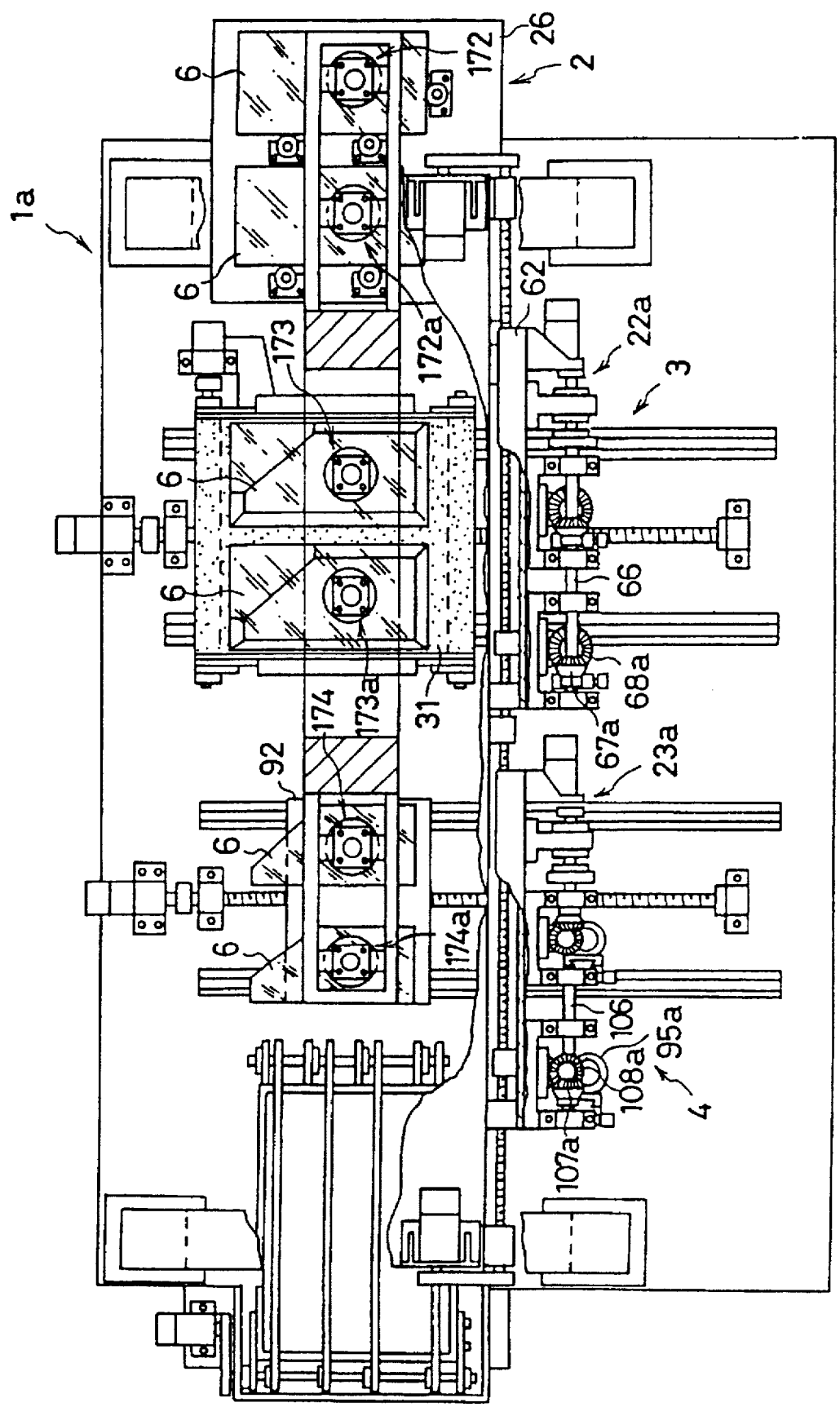
FIG. 7 is a partially cutaway plan view of the embodiment shown in FIG. 6.
Figure 8:
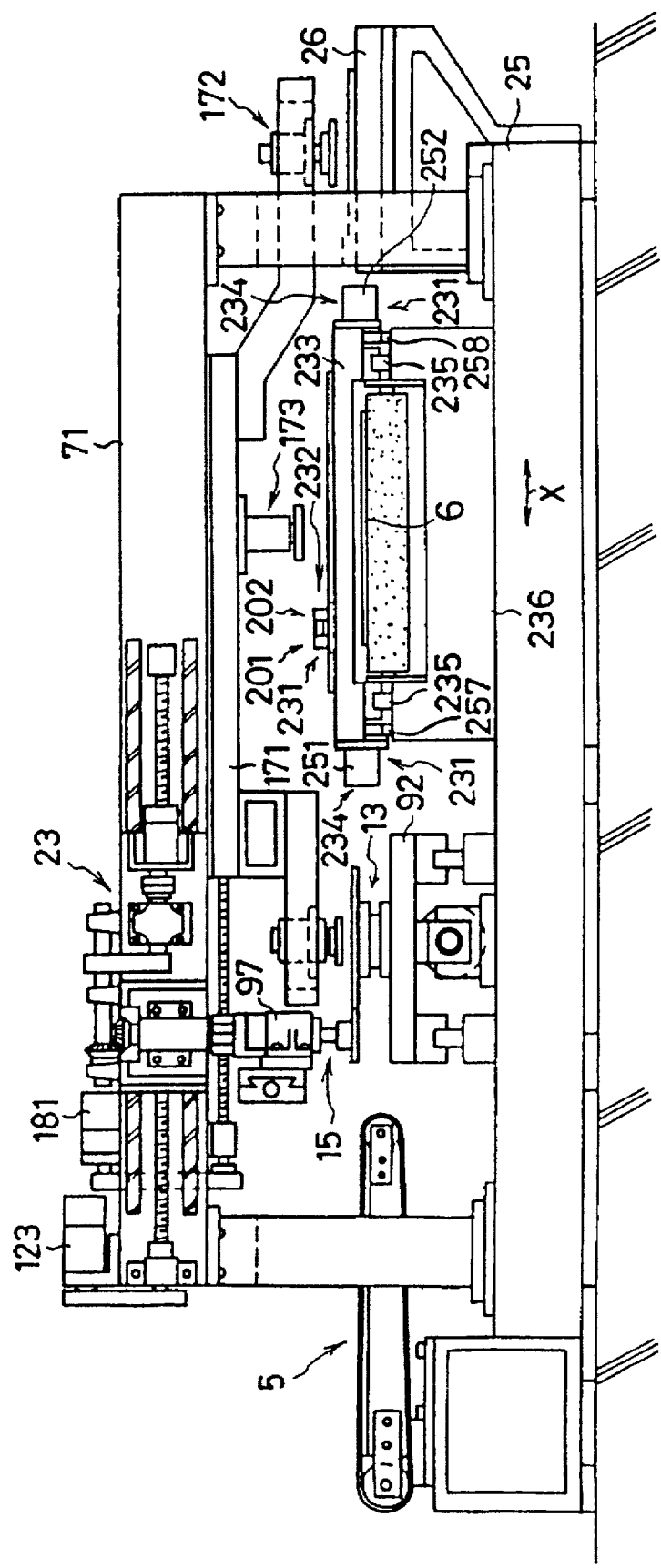
FIG. 8 is a front elevational view of still another preferred embodiment of the present invention.
Figure 9:
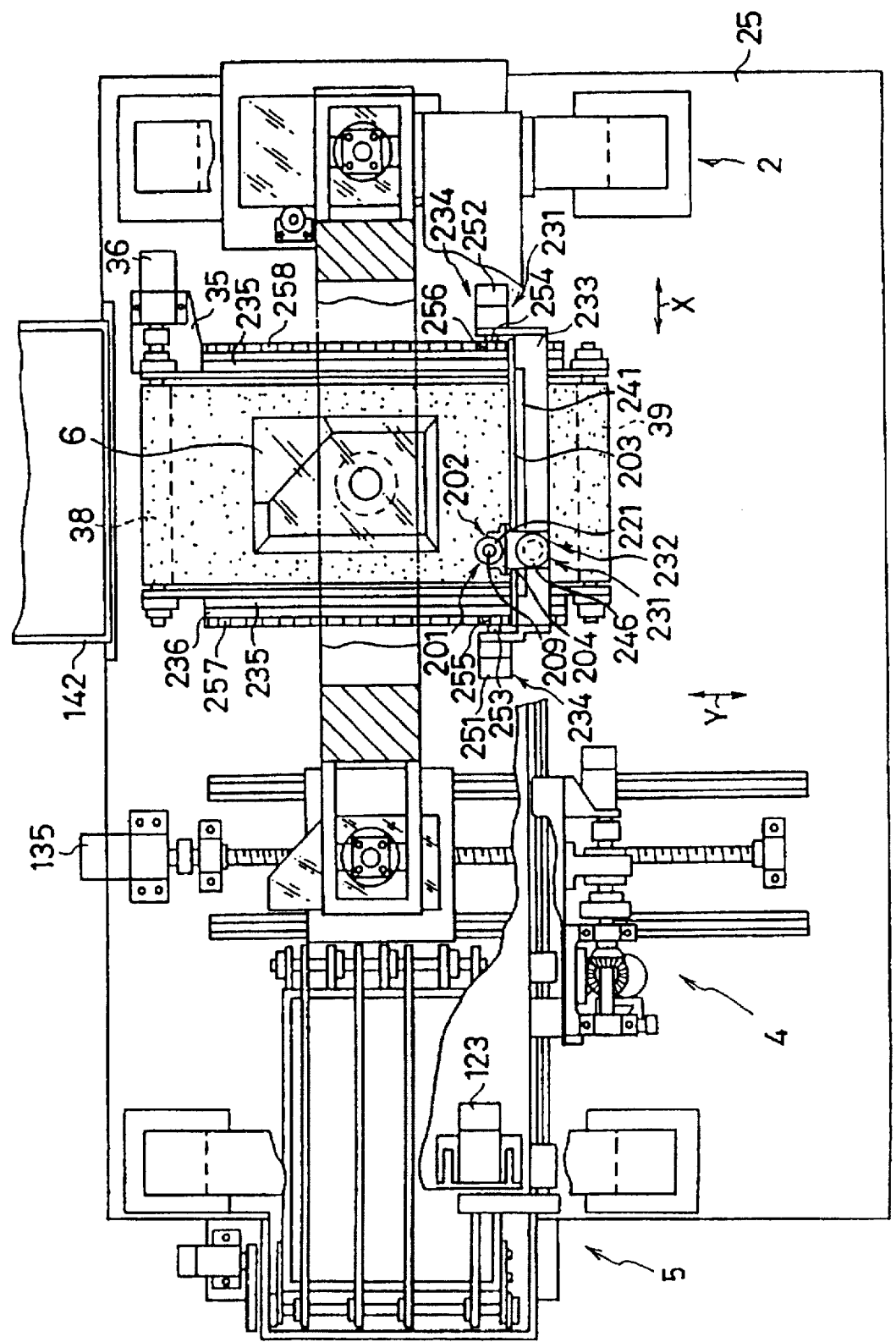
FIG. 9 is a partially cutaway plan view of the embodiment shown in FIG. 8.
Figure 10:
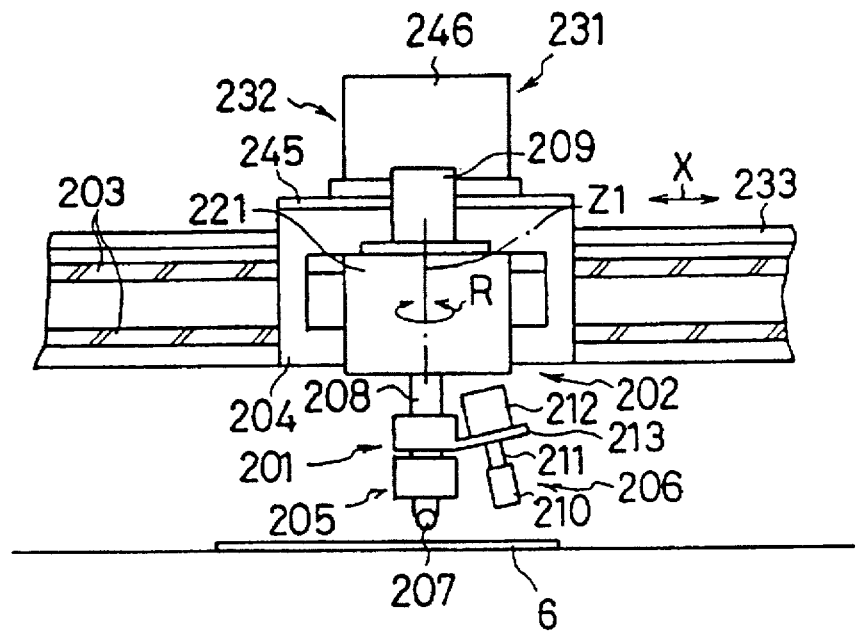
FIG. 10 is a partially detailed explanatory diagram of the embodiment shown in FIG. 8.
Figure 11:
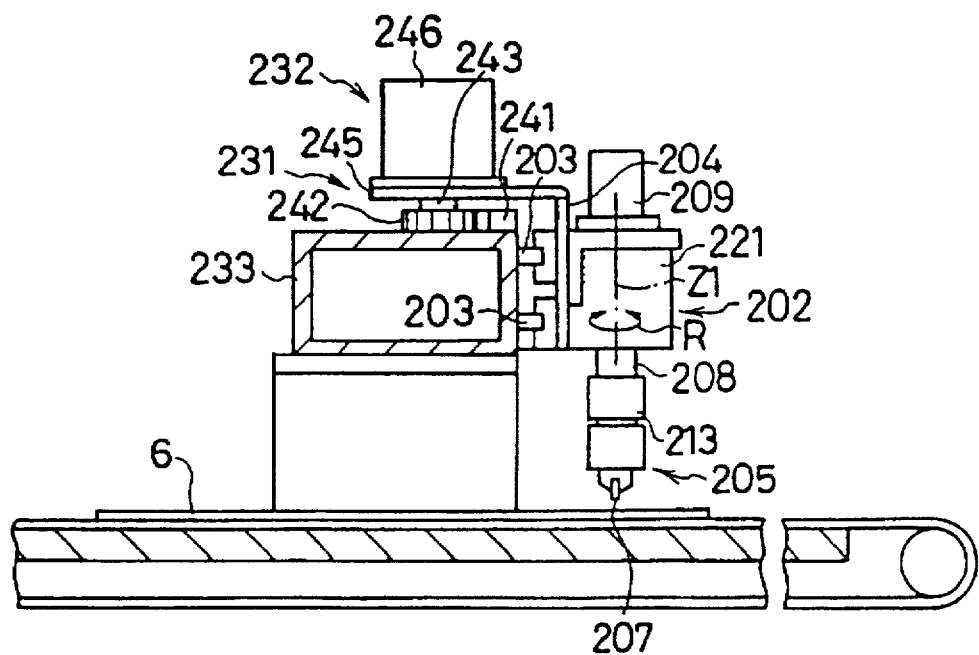
FIG. 11 is a partially detailed explanatory diagram of the embodiment shown in FIG. 8.

That is, in a glass-plate working apparatus in the example shown in FIGS. 6 and 7, the supporting base 26 of the glass plate carrying-in section 2 and the endless belt 31 of the glass plate bend-breaking section 3 are formed such that two glass plates 6 are simultaneously placed thereon, respectively. The glass plate bend-breaking section 3 is provided with, in addition to the bend-breaking head device 11, a bend-breaking head device 11a arranged in the same way as the bend-breaking head device 11. The glass plate peripheral-edge grinding section 4 is provided with, in addition to the grinding head device 15 and the vacuum sucking unit 93, a grinding head device 15a and a vacuum sucking unit 93a arranged in the same way as the grinding head device 15 and the vacuum sucking unit 93.

The bend-breaking head device 11a is provided with a cutter device 45a for forming the main cut line 8 and the edge cut line 9 as well as a press-breaking device 46a for press-breaking the glass plate 6. Their pneumatic cylinder units 49a and 54a are mounted on a bracket 51a. A bend-breaking head rotating device 22a in this example is provided with, in addition to the arrangement of the above-described bend-breaking head rotating device 22, a bevel gear 67a secured to the elongated rotating shaft 66 as well as a Z-shaft member 70a in which a bevel gear 68a meshing with the bevel gear 67a is secured to an upper end thereof and the bracket 51a is secured to a lower end thereof, the Z-axis member 70a being rotatably supported by the elongated slider 62 via a bearing 69a. The grinding head device 15a has a grinding wheel 95a and an electric motor 97a mounted on a bracket 99a. A grinding-head rotating device 23a in this example is provided with, in addition to the arrangement of the above-described grinding-head rotating device 23, a bevel gear 107a secured to the elongated rotating shaft 106 as well as a Z-shaft member 110a in which a bevel gear 108a meshing with the bevel gear 107a is secured to an upper end thereof and the bracket 99a is secured to a lower end thereof, the Z-axis member 110a being rotatably supported by the elongated slider 62 via a bearing 109a. The bracket 99a is attached to the Z-axis member 110a. The vacuum sucking unit 93a is arranged in the same way as the vacuum sucking unit 93, and is disposed on the lsider 92. In addition, a transporting device 21a of the glass-plate working apparatus 1a is provided with, in addition to the arrangement of the transporting device 21, three additional lifting units 172a, 173a, and 174a respectively attached to the slider 171 by means of the bracket 170. These lifting units 172a, 173a, and 174a are arranged in the same way as the lifting units 172, 173, and 174.

The other arrangement of the glass-plate working apparatus 1a is provided in the same way as the glass-plate working apparatus 1. Accordingly, with the glass-plate working apparatus 1a, two glass plates 6 are synchronously subjected to bend-breaking and grinding in the glass plate bend-breaking section 3 and the glass plate peripheral-edge grinding section 4, respectively, in a similar manner, and are synchronously transported by the transporting device 21a.

In accordance with the glass-plate working apparatus 1a as well, it is possible to produce glass plates of given configurations with even higher productivity. In addition, the installation space can be made small, and the problems associated with the transport of the glass plates can be reduced.

In addition, the bend-breaking head device, the bend-breaking head rotating device, and the bend-breaking head moving device of the glass-plate working apparatuses 1 and 1a may be arranged as shown in FIGS. 8 to 11. That is, in FIGS. 8 to 11, a bend-breaking head device 201 and a bend-breaking head rotating device 202 are mounted on a slider 204 fitted to a pair of guide rails 203 extending in the X direction in parallel to each other, the slider 204 being movable in the X direction. The bend-breaking head device 201 is provided with a cutter device 205 for forming the main cut line 8 and the edge cut line 9 as well as a press-breaking device 206 for press-breaking the glass plate 6. The cutter device 205 is provided with a cutter wheel 207 and a pneumatic cylinder unit 209 having a piston rod 208 with the cutter wheel 207 attached to a distal end thereof. The press-breaking device 206 is provided with a pressing member 210 and a pneumatic cylinder unit 212 having a piston rod 211 with the pressing member 210 attached to a distal end thereof. The pneumatic cylinder unit 212 is attached to the piston rod 208 by means of an attaching member 213.

In FIGS. 8 to 11, a bend-breaking head rotating device 220 is constituted by an electric motor 221 through which the piston rod 208 is passed and which rotates the piston rod 208 about the Z1 axis in the R direction, a rotor-side outer case of the electric motor 221 being attached to the slider 204. Accordingly, the piston rod 208 is lowered and raised by the actuation of the pneumatic cylinder unit 209, and is rotated about the Z1 axis in the R direction by the operation of the electric motor 221. Consequently, the cutter wheel 207 is pressed against the glass plate 6, and the pressing thereof is canceled, the blade of the cutter wheel 207 being oriented in the direction in which the main cut line 8 and the edge cut line 9 are formed. Meanwhile, the pressing direction of the pressing member 210 is oriented in a predetermined direction. The pressing and retraction of the pressing member 210 are effected by the actuation of the pneumatic cylinder unit 212.

In FIGS. 8 to 11, a bend-breaking head moving device 231 is provided with an X-direction moving unit 232 for moving the slider 204 with the bend-breaking head device 201 and the bend-breaking head rotating device 202 mounted thereon in the X direction, as well as a Y-direction moving unit 234 for moving a slide frame 233 disposed on the endless belt 31 in the Y direction. The bend-breaking head device 201 is moved in the X and Y directions by the movement of the slider 204 in the X direction and the movement of the slide frame 233 in the Y direction. The slide frame 233 is fitted to a pair of guide rails 235 in such a manner as to be movable in the Y direction, and the pair of guide rails 235 are attached to a fixing base 236 in such a manner as to extend in the Y direction in parallel to each other. The fixing base 236 is fixed to the base 25.

The X-direction moving unit 232 is provided with a pinion meshing with the teeth of a rack 241 secured to the slide frame 233 in such a manner as to extend in the X direction, as well as an electric motor 246 having an output rotating shaft 243 with the pinion secured to a distal end thereof, the electric motor 246 being attached to the slider 204 by means of a bracket 245. As the output rotating shaft 243 rotates due to the operation of the electric motor 246, the pinion 242 meshing with the teeth of the rack 241 is rotated to move the slide 204 in the X direction via the bracket 245, thereby moving the bend-breaking head device 201 in the X direction.

The Y-direction moving unit 234 is provided with electric motors 251 and 252 attached to both ends of the slide frame 233, respectively, as well as pinions 255 and 256 secured to respective output rotating shafts 253 and 254 of of the electric motors 251 and 252, respectively. The pinions 255 and 256 respectively mesh with the teeth of racks 257 and 258 attached to the fixing base 236 in such a manner as to extend in the Y direction in parallel to each other. As the output rotating shafts 253 and 254 rotate due to the synchronous operation of the two electric motors 251 and 252, the pinions 255 and 256 meshing with the teeth of the racks 257 and 258 are rotated to move the slide frame 233 in the Y direction, thereby moving the bend-breaking head device 201 in the Y direction.

Incidentally, the driving drum 38 and the driven drum 39 of the supporting device 7 is supported rotatably by the fixing base 236, and the frame 35 is also supported by the fixing base 236. Accordingly, in this example the supporting device 7 is not moved in the Y direction.

The bend-breaking head device 201, the bend-breaking head rotating device 202, and the bend-breaking head moving device 231 described above and shown in FIGS. 8 to 11 operate in the same way as the above-described bend-breaking head device, bend-breaking head rotating device, and the bend-breaking head moving device.

I claim:

1. A glass plate working apparatus comprising:

a glass plate carrying-in section a glass plate bend-breaking section disposed in proximity to said glass plate carrying-in section;

a glass plate peripheral-edge grinding section disposed in proximity to said glass plate bend-breaking section; and a glass plate carrying-out section disposed in proximity to the glass plate peripheral-edge grinding section, wherein said glass plate bend-breaking section is provided with a supporting device for supporting a glass plate from said glass plate carrying-in section; at least one bend-braking head device for forming a cut line for bend-breaking on the glass plate supported by said supporting device, and for pressing a predetermined position on the glass plate on which the cut line has been formed, so as to bend-break the glass plate; a bend-breaking head moving device for relatively moving said bend-breaking head device with respect to the glass plate supported by said supporting device, in correspondence with the cut line for bend-breaking to be formed as well as the predetermined position on the glass plate to be pressed, and a bend-breaking head rotating device for rotating said bend-breaking head device about an axis which is perpendicular to a plane of movement of said bend-breaking head device by said bend-breaking head moving device, said bend-breaking head device having a cutter device for forming the cutting line including a main cut line and an edge cut line, and a press-breaking device for press-breaking the glass plate, wherein said glass plate peripheral-edge grinding section is provided with a supporting device for supporting the glass plate from said glass plate bend-breaking section; at least one grinding head device for grinding a bend-broken edge of the glass plate supported by said supporting device of said glass plate peripheral-edge grinding section; and a grinding-head moving device for relatively moving said grinding head device with respect to the glass plate supported by said supporting device of said glass plate peripheral-edge grinding section in correspondence with the bend-broken edge of the glass plate to be ground, and wherein said glass plate carrying-out section is provided with carrying-out device for carrying out the glass plate from said glass plate peripheral-edge grinding section.

2. A glass-plate working apparatus according to claim 1, wherein said bend-breaking head rotating device includes a common supporting member rotatable about the axis, said cutter device and said press-breaking device being supported in common by said rotatable common supporting member.

3. A glass-plate working apparatus according to claim 1, further comprising: a transporting device for transporting the glass plate from said glass plate carrying-in section to said supporting device of said glass plate bend-breaking section, from said supporting device of said glass plate bend-breaking section to said supporting device of said glass plate peripheral-edge grinding section, and from said supporting device of said glass plate peripheral-edge grinding section to said carrying-out device of said glass plate carrying-out section, respectively.

4. A glass-plate working apparatus according to claim 1, wherein said supporting device of said glass plate bend-breaking section is provided with a belt conveyor having a flexible endless belt, a supporting member for supporting said flexible endless belt on a reverse side thereof, and a moving device for moving said endless belt.

5. A glass-plate working apparatus according to claim 1, further comprising: a grinding-head rotating device for rotating said grinding head device about an axis which is perpendicular to a plane of movement of said grinding head device by said grinding-head moving device.

6. A glass-plate working apparatus comprising:

a supporting device for supporting a glass plate;

at least one bend-breaking head device for forming a cut line for bend-breaking on the glass plate supported by said supporting device, and for pressing a position on the glass plate on which the cut line has been formed, so as to bend-break the glass plate;

a bend-breaking head moving device for relatively moving said bend-breaking head device with respect to the glass plate supported by said supporting device, in correspondence with the cut line for bend-breaking to be formed as well as the position on the glass plate to be pressed, and a bend-breaking head rotating device for rotating said bend-breaking head device about an axis which is perpendicular to a plane of movement of said bend-breaking head device by said bend-breaking head moving device, said bend-breaking head device having a cutter device for forming the cutting line including a main cut line and an edge cut line, and a press-breaking device for press-breaking the glass plate.

7. A glass-plate working apparatus according to claim 6, wherein said bend-breaking head rotating device includes a common supporting member rotatable about the axis, said cutter device and said press-breaking device being supported in common by said rotatable common supporting member.

* * * * *